(12) United States Patent
Hatfield

(10) Patent No.: US 8,479,371 B2
(45) Date of Patent: Jul. 9, 2013

(54) PROCESS FOR TREATMENT OF POROUS SUBSTRATES

(75) Inventor: Martin Gregory Hatfield, Odessa, MO (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 12/883,323

(22) Filed: Sep. 16, 2010

(65) Prior Publication Data

US 2012/0066890 A1     Mar. 22, 2012

(51) Int. Cl.
 *B32B 27/08* (2006.01)
(52) U.S. Cl.
 USPC .............................. 29/559; 29/281.6; 29/282
(58) Field of Classification Search
 USPC ................ 29/559, 281.6, 282, 896.6, 896.62, 29/527.1, 527.2, 895, 895.22, 895.211, 895.23, 29/895.32, 895.2
 See application file for complete search history.

(56) References Cited

U.S. PATENT DOCUMENTS

| | | | |
|---|---|---|---|
| 3,216,459 A * | 11/1965 | Schroeder et al. ............ 138/139 |
| 5,211,846 A * | 5/1993 | Kott et al. ..................... 210/232 |
| 6,410,084 B1 | 6/2002 | Klare et al. |
| 6,676,993 B2 | 1/2004 | Klare |
| 6,854,603 B2 | 2/2005 | Klare |
| 7,374,796 B2 | 5/2008 | Smithies |
| 7,407,703 B2 * | 8/2008 | DeYoung et al. .......... 428/319.3 |
| 7,534,471 B2 | 5/2009 | Klare et al. |
| 7,635,062 B2 | 12/2009 | Klare et al. |
| 2004/0059717 A1 | 3/2004 | Klare et al. |
| 2008/0272048 A1 * | 11/2008 | Mei et al. .................... 210/493.2 |

* cited by examiner

*Primary Examiner* — David Bryant
*Assistant Examiner* — Christopher Besler
(74) *Attorney, Agent, or Firm* — Cooper Legal Group, LLC

(57) ABSTRACT

A process and an associated assembly for supporting a porous media during a treatment which exposes the media to a fluid that modifies at least one property of the media. The assembly includes a supporting core. The media is wrapped in a plurality of layers about the core to form a first roll of the media. The assembly includes first securement mechanisms exerting diametrical pressure on the ends of the first roll to prevent fluid flow axially out of the ends of the first roll. An additional amount of the media is being wrapped in a plurality of layers about the first roll to form a second roll of the media. The assembly includes second securement mechanisms exerting diametrical pressure on the ends of the second roll to prevent fluid flow axially out of the ends of the second roll. The assembly may be part of equipment.

16 Claims, 2 Drawing Sheets

PROCESS FOR TREATMENT OF POROUS SUBSTRATES

BACKGROUND OF THE INVENTION

1. Field of the Invention

The present invention relates generally to treating a porous media, such as membrane. In particular, the present invention relates to an assembly for supporting a porous media during a treatment which exposes the media to a fluid that is adapted to modify at least one property of the media.

2. Discussion of Prior Art

U.S. Pat. No. 7,534,471 is directed to a process for modifying at least one property of a porous media. A disclosed process includes the steps of providing a porous media and exposing the media to a fluid at supercritical conditions. At least one property of the media is modified while the media is exposed to the fluid. The fluid passes through the media after the media formed into a roll on a perforate core support. The fluid flows from within the core support and transaxially through the rolled media. Bands are applied to the ends of the rolled media in order to prevent leaks from the ends of the roll. Bands are applied to only an outside layer of the roll.

When processing a roll having a relatively large length of material, a relatively large outer diameter, or both, the porous media may be subjected to non-uniform radial treatment within the roll. An example is a resulting relatively higher oil repellency performance for media closest to the perforated core and relatively lower repellency for media furthest from the core. It is believed that this is caused by inconsistent compression from the bands when applied to larger diameter rolls. This inconsistency may be allowing treatment solutions to leak out the ends of the rolled porous medicine.

There is a desire to treat larger rolls having higher lengths, larger diameters, or both, without applying inconsistent compression from the bands.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to indentify key/critical elements or to delineate the scope of such systems and/or methods. Its sole purpose is to present some concepts in a simplified form as a prelude to the more detailed description that is presented later.

In accordance with one aspect, the present invention provides a process for supporting a porous media during a treatment which exposes the media to a fluid that modifies at least one property of the media via flow of the fluid through the media. The process includes providing a perforate supporting core extending along an axis, and wrapping the media in a plurality of layers about the core to form a first roll of the media. The process includes applying first securement mechanisms at each end of the first roll for exerting diametrical pressure on the ends of the first roll to prevent fluid flow axially out of the ends of the first roll, and wrapping an additional amount of the media in a plurality of layers about the first roll to form a second roll of the media. The process also includes applying second securement mechanisms at each end of wrapped layers of the second roll for exerting diametrical pressure on the ends of the second roll to prevent fluid flow axially out of the ends of the second roll.

In accordance with another aspect, the present invention provides an assembly for supporting a porous media during a treatment which exposes the media to a fluid that modifies at least one property of the media via flow of the fluid through the media. The assembly includes a perforate supporting core extending along an axis. The media is wrapped in a plurality of layers about the core to form a first roll of the media. The assembly includes first securement mechanisms at each end of the first roll exerting diametrical pressure on the ends of the first roll to prevent fluid flow axially out of the ends of the first roll. An additional amount of the media is being wrapped in a plurality of layers about the first roll to form a second roll of the media. The assembly includes second securement mechanisms at each end of wrapped layers of the second roll exerting diametrical pressure on the ends of the second roll to prevent fluid flow axially out of the ends of the second roll.

In accordance with another aspect, the present invention provides equipment for modifying at least one property of a porous media. The equipment includes a treatment vessel within which the media is exposed to a fluid via flow of the fluid through the media and a circulation pump for moving the fluid within a loop that includes the treatment vessel. The equipment also includes an assembly for supporting the media within the treatment vessel. The assembly includes a perforate supporting core extending along an axis. The media is wrapped in a plurality of layers about the core to form a first roll of the media. The assembly includes first securement mechanisms at each end of the first roll exerting diametrical pressure on the ends of the first roll to prevent fluid flow axially out of the ends of the first roll. An additional amount of the media is being wrapped in a plurality of layers about the first roll to form a second roll of the media. The assembly includes second securement mechanisms at each end of wrapped layers of the second roll exerting diametrical pressure on the ends of the second roll to prevent fluid flow axially out of the ends of the second roll.

BRIEF DESCRIPTION OF THE DRAWINGS

The forgoing and other aspects of the invention will become apparent to those skilled in the art to which the invention relates upon reading the following description with reference to the accompanying drawings in which.

DETAILED DESCRIPTION OF THE INVENTION

Figure 1:
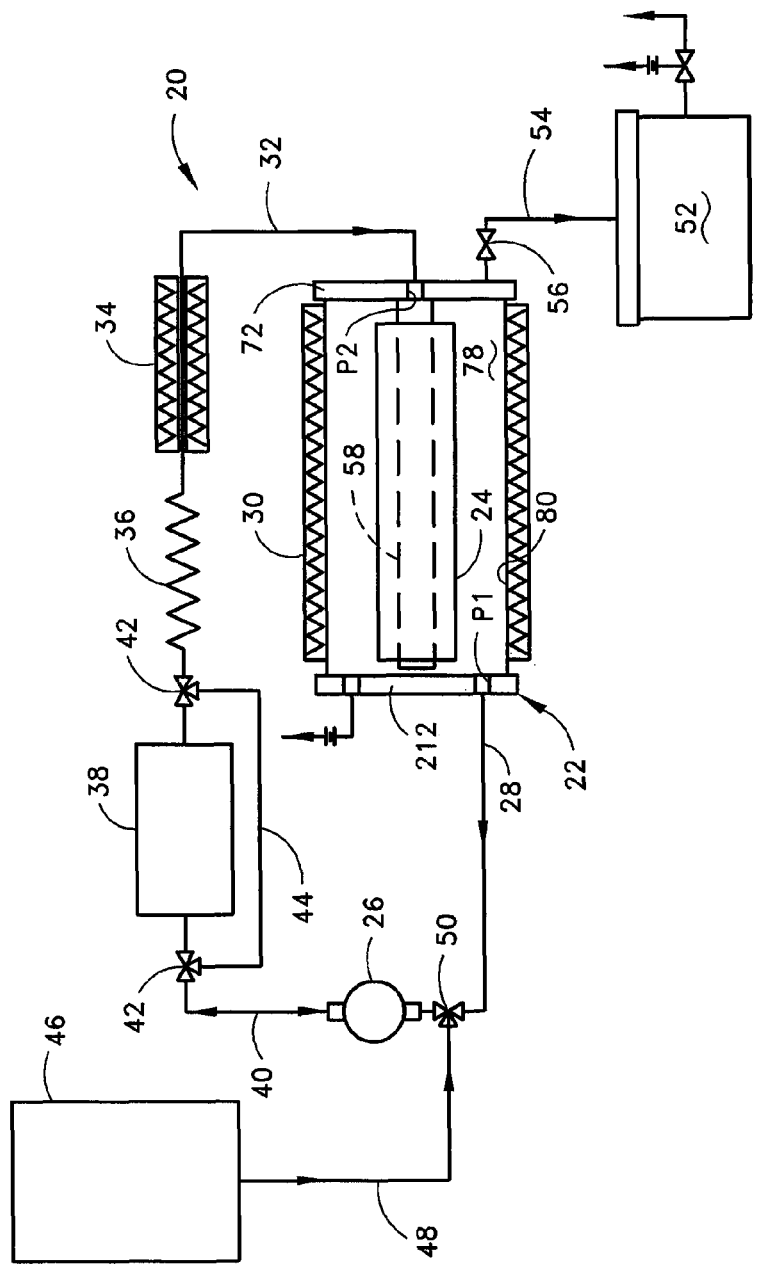
FIG. 1 is a schematic view of process equipment used to treat a media in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

The present invention related to treatments to porous media, such as a membrane. Such treatments may be for the modification of at least one property of such media (e.g., membrane). One example media is a membrane that includes expanded polytetrafourorthylene (ePTFE) having interconnecting pores extending there through. Example properties that can be modified may include oleophobicity or hydropholicity or surface energy. Specifics concerning the porous media (e.g., membrane) and/or the one or more properties that are modified are not specific limitations upon the present invention. Specific examples of porous membranes and one or more properties that can be modified are known in the art. Some examples are presented within U.S. Pat. No. 7,534,471. As such, the porous membranes and one or more properties are not discussed herein in great detail herein. Also, the present invention relates to improvements in methodologies and structures associated with such modification of one or more properties of such porous media.

An example of equipment 20 for use in a method of treating media 24 in accordance with an aspect of the present invention is schematically illustrated in FIG. 1. The equipment 20 includes a treatment vessel 22 for holding a porous media 24 during treatment of the media. Treatment may include the application of heat and/or pressure to the media 24 within the treatment vessel 22 during treatment. In one example, the treatment vessel 22 is an autoclave capable of withstanding pressure of up to 10,000 psi (about 600 bar) and elevated temperature in the range of 100° C. to 300° C. (212° F. to 572° F.). The treatment vessel 22 has an external heater 30 to maintain the walls of the treatment vessel 22 at the predetermined temperature. The treatment vessel 22 is sized appropriately to treat a desired length and width of a rolled amount of the media 24 as will be described further following. Also, within the shown example, treatment of the porous media 24 includes delivery of fluid such as $CO_2$, e.g., super-critical $CO_2$ ($SCCO_2$), as a solvent to the porous media 24. However, the specific fluid, the reaction caused by the fluid to the porous media 24, etc. need not be specific limitations upon the present invention.

The treatment vessel 22 is fluidly connected to a supply and circulation pump 26 by a line 28 as part of a fluid circulation loop that includes the treatment vessel 22. The connection is at a first fluid port P1 of the treatment vessel 22. The treatment vessel 22 is also connected within the fluid circulation loop by a line 32 to a temperature control device 34, optional static mixer 36 and a treatment introduction vessel 38. The treatment introduction vessel 38 is connected to the pump 26 through a line 40. Two bypass valves 42, one on each side of the treatment introduction vessel 38, allow flow through a line 44 to bypass the treatment introduction vessel 38. The temperature control device 34 may provide heating or cooling to the line 32 and the fluid contained in the line 32. Any or all of the lines and vessels may be heated or cooled to compensate for cooling when the fluid ($CO_2$) expands or heating when the fluid ($CO_2$) is compressed.

The pump 26 is also connected to a solvent storage container 46 through a line 48 and a valve 50. The storage container 46 houses the fluid such as liquid $CO_2$ (solvent) under pressure and is maintained at a temperature to assure delivery of the fluid ($CO_2$) in a liquid phase to the pump 26. The treatment vessel 22 is also connected to a separation and recovery station 52 through a line 54 and a valve 56. The separation and recovery station 52 is vented to atmosphere or may be optionally connected (as represented by the outwardly directed line extending from the recovery station 52) to the storage container 46 for reusing recovered fluid ($CO_2$).

Figure 2:
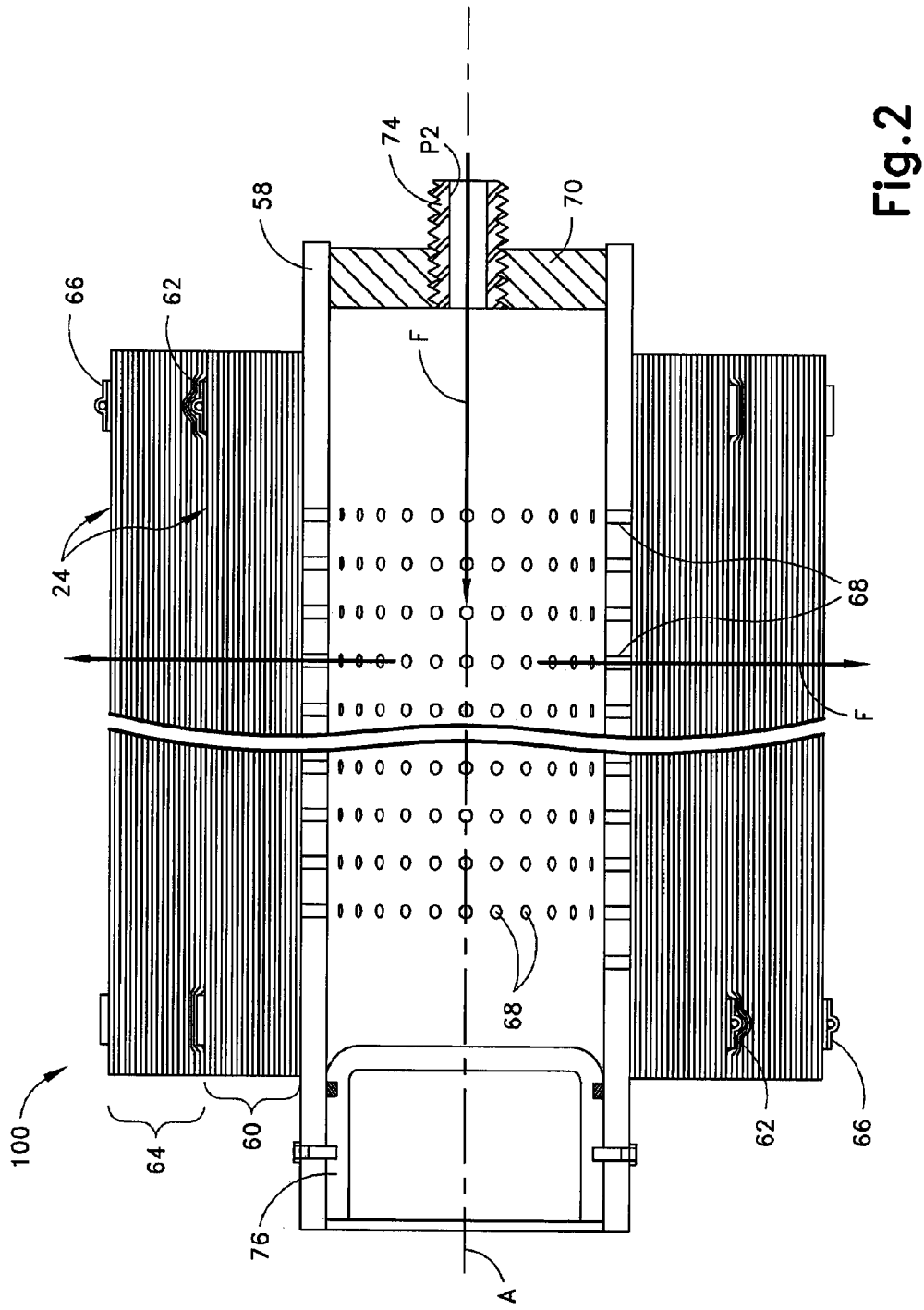
FIG. 2 is enlarged sectional view of a portion of the equipment illustrated in FIG. 1, which includes an assembly for supporting a porous media in accordance with an aspect of the present invention.

Turning to specifics concerning treatment process of the media 24, a hollow, perforate supporting core 58 (only schematically shown in FIG. 1) is provided within the treatment vessel 22. An interior of the perforate supporting core 58 is in fluid communication with the line 32 at a second port P2 of the treatment vessel 22. The perforate supporting core 58 is hollow cylindrical and extends along a central axis A (which extends along a left-right line as viewed in the Figures). The core 58 is made from any suitable material such as stainless steel and includes a multitude of perforations or apertures 68 extending radially through the core 58. As shown in FIG. 2, the apertures 68 are spaced to extend about the periphery and along the axial length of the perforate supporting core 58.

Similar to the treatment vessel 22 the perforate supporting core 58 is sized appropriately to treat a desired length and width of the rolled media 24. It is to be noted that the perforate supporting core 58 and the rolled media 24 are shown with a mid-way tear line in FIG. 2 to indicate that the torn dimension is variable. It should be appreciated that the treatment vessel 22 and the supporting core 58 are shown as extending horizontally. However, it is to be understood that the treatment vessel 22 and the core 58 could be oriented in a vertical direction or any other orientation.

The untreated media 24 is rolled onto the perforate supporting core 58 prior to placement within the treatment vessel 22. The supporting core 58 and thus the media 24 rolled thereon will generally be coaxial on the central axis A. A first amount of the media 24 is wrapped in a plurality of layers on the supporting core 58 to form a first roll 60. The amount may be varied but in one example a length of 100 yards of the media 24 is wrapped to form the first roll 60. As such, the number of wraps is variable and the number of wraps shown in FIG. 2 is not a limitation.

First securement mechanisms 62 are applied adjacent to each axial end (i.e., left and right ends as viewed in FIG. 2) of the first roll 60. In one example, the first securement mechanisms 62 are tensioned, circular clamping bands which exert radially inward diametrical pressure on the roll 60 to hold the media on the core 58 and prevent fluid flow axially out of the ends of the first roll 60. In one specific example, the bands of the first securement mechanisms 62 are made of stainless steel. The first securement mechanisms 62 are at a first diameter as measured based upon the central axis A.

After the first roll 60 has been wrapped/assembled on the core 58 in the foregoing manner, a second roll 64 is wrapped about the first roll 60. As shown, the second roll 64 can also overlay the first securement mechanisms 62. In one example, an additional 100 yards of the media 24 is wrapped about the first roll 60 to form the second roll 64 around the supporting core 58 and the first roll 60. Of course the length and thus the number of wraps are variable. Similar to the first roll 60, the second roll 64 is generally coaxial with the supporting core 58 upon the axis A. The number of wraps is variable and the number of wraps shown in FIG. 2 is not a limitation. It is to be appreciated that the first and second rolls 60, 64 are at least part of a plurality of rolls.

Second securement mechanisms 66 are applied at each axial end of the second roll 64. In one example, the second securement mechanisms 66 are circular, tensioned clamping bands which exert radially inward diametrical pressure on the roll 64 to hold the second roll 64 on the first roll 60 and prevent fluid flow axially out the ends of the second roll 64. In one specific example, the bands providing the first securement mechanisms 62 are made of stainless steel.

In the shown example, the second securement mechanisms 66 (e.g., second bands) are placed directly, radially above the first securement mechanisms 62 (e.g., first bands) so as to be radially overlaid. In the alternative, the second securement mechanisms 66 (e.g., second bands) are placed so as not to be so overlaid (e.g., slightly offset to be closer to the axial edges of the second roll 64). The second securement mechanisms 62 are at a second diameter as measured based upon the central axis A with the second diameter being greater than the first diameter location of the first securement mechanisms 62.

The supporting core 58 and the first and second securement mechanisms 62 and 66 thus provide parts of an assembly 100 for supporting the porous media 24. The support is provided during a treatment which exposes the media 24 to a fluid that modifies at least one property of the media 24 via flow F of the fluid through the media 24.

Flowing fluid ($CO_2$) enters the perforate supporting core 58, flows through the perforations of the perforate supporting core 58 and through the first and second rolls 60 and 64 of the porous media 24 as shown by the three arrows F in FIG. 2. The securement mechanisms 62 and 66 are sufficiently tightened so that no fluid is permitted to flow in a direction axially out the ends of the rolls 60 and 64 but can only flow radially or transaxially through the media pores in every wrap of the rolls 60 and 64 as represented by the arrows F extending up and down as shown in FIG. 2. The core 58 and the rolls 60 and 64 are sized and supported in the treatment vessel 22 so the rolls 60 and 64 do not contact the interior of the treatment vessel 22 and flow can occur radially out from and around the entire outer extend of the second roll 64 of the media 24.

While any suitable construction, configuration and connection may be used to direct the flow through the apertures 68 and thus through the first and second rolls 60 and 64, one example support and cap structure for the core 58 is shown in the Figures. Turning first to FIG. 2, the core 58 is sealed at one axial end with a core end cap 70 that is welded and/or otherwise secured to the core 58. The core end cap 70 is attached to a removably secured end cap 72 (FIG. 1) of the treatment vessel 22 by a threaded connection 74 (FIG. 2). The threaded connection 74 has a through-bore that provides the second port P2. In other words, the through-bore of the threaded connection 74 is in fluid communication with the line 32. As such, the interior of the core 58 is in fluid connection with the line 32.

The other axial end of the core 58 has a second removably securable core end cap 76 that prevents fluid flow out that end of the core 58. With all other flow path options blocked, the apertures 68 in the core 58 direct fluid flow from the inside of the core 58, through the pores in all layers of the media 24 and into a space 78 (FIG. 1) between the exterior of the roll of media and the interior wall 80 of the treatment vessel 22, as indicated by the arrows F (FIG. 2). Fluid flows from the space 78 in the treatment vessel 22 out from the port P1 and to the line 28.

As can be appreciated, one aspect of the present invention is to use multiple sets of bands (e.g., 62, 64) associated with multiple rolls (e.g., 60, 64). The shown example has two sets of bands (e.g., 62, 64) and two rolls (e.g., 60, 64). The use of multiple sets of bands provides improvements over the use of a single set of bands. For example, use of multiple sets of bands allows for processing of larger rolls (higher yardage, larger diameter or both) of porous sheet material wound upon the perforate supporting core 58. Uniform application of radially inward compressive force and/or effective sealing can be achieved by multiple bands. Also, the material within the multiple rolls may have a reduced porosity as compared to materials that are processed using an arrangement with only a single set of bands. Materials that have such reduced porosity will generally cause increased pressure within the interior of the supporting core 58 and/or an increased pressure drop between the radially inner-most extent of the multiple rolls and the radially outer-most extent of the multiple rolls. Also, the use of multiple sets of bands at increasing diameter provides can more consistent compression of the ends of the rolled porous sheet material in order to help prevent leakage through the ends of the rolls as compared to use of just a single set of bands.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A process for supporting a porous media during a treatment which exposes the media to a fluid that modifies at least one property of the media via flow (F) of the fluid through the media, the process including:
   providing a perforate supporting core extending along an axis;
   wrapping the media in a plurality of layers about the core to form a first roll of the media;
   applying first securement mechanisms that do not extend the axial length of the first roll, subsequent to wrapping to form the first roll, at each end of the first roll for exerting diametrical pressure on the ends of the first roll to prevent fluid flow axially out of the ends of the first roll, while allowing flow of fluid in a direction outward from the core, outward through the media of the first roll and outward past the first securement means;
   wrapping, subsequent to applying the first securement mechanisms, an additional amount of the media in a plurality of layers about the first roll to form a second roll of the media, which overlays the first securement mechanisms; and
   applying second securement mechanisms that do not extend the axial length of the second roll, subsequent to wrapping to form the second roll, at each end of wrapped layers of the second roll for exerting diametrical pressure on the ends of the second roll to prevent fluid flow axially out of the ends of the second roll, while allowing flow of fluid in the direction outward from the core, outward through the media of the second roll and outward past the second securement means.

2. A process according to claim 1, wherein the steps of applying the first and second securement mechanisms and include applying bands for encircling the respective rolls.

3. A process according to claim 2, wherein the bands are stainless steel.

4. A process according to claim 1, wherein the step of providing a perforate supporting core includes providing the perforate supporting core as a hollow cylinder having a multiplicity of apertures there through.

5. A process according to claim 1, wherein the step of providing a perforate supporting core includes providing a first end cap closing one end of the core and a second end cap closing the other end of the core an inlet in the first end cap for conducting treatment fluid therein.

6. A process according to claim 1, wherein the media includes a membrane with expanded polytetrafourorthylene (ePTFE) having interconnecting pores.

7. A process according to claim 1, wherein the step of applying the second mechanisms includes radially overlaying the second mechanisms to the first mechanisms.

8. A process according to claim 1, wherein the first and second rolls are at least part of a plurality of rolls.

9. An assembly for supporting a porous media during a treatment which exposes the media to a fluid that modifies at least one property of the media via flow (F) of the fluid through the media, the assembly including:
   a perforate supporting core extending along an axis, the media being wrapped in a plurality of layers about the core to form a first roll of the media;

first securement mechanisms that do not extend the axial length of the first roll at each end of the first roll exerting diametrical pressure on the ends of the first roll to prevent fluid flow axially out of the ends of the first roll while allowing flow of fluid in a direction outward from the core, outward through the media of the first roll and outward past the first securement mechanism, an additional amount of the media being wrapped in a plurality of layers about the first roll to form a second roll of the media to overlay the first securement mechanisms; and second securement mechanisms that do not extend the axial length of the second roll at each end of wrapped layers of the second roll exerting diametrical pressure on the ends of the second roll between the first and second securement mechanisms to prevent fluid flow axially out of the ends of the second roll while allowing flow of fluid in the direction outward from the core, outward through the media of the second roll and outward past the second securement mechanism.

10. An assembly according to claim 9, wherein the first and second securement mechanisms and include bands encircling the respective rolls.

11. An assembly according to claim 10, wherein the bands are stainless steel.

12. An assembly according to claim 9, wherein the perforate supporting core is a hollow cylinder having a multiplicity of apertures there through.

13. An assembly according to claim 9, wherein a first end cap closes one end of the core and a second end cap closes the other end of the core an inlet in the first end cap for conducting treatment fluid therein.

14. An assembly according to claim 9, wherein the media includes a membrane with expanded polytetrafourorthylene (ePTFE) having interconnecting pores.

15. An assembly according to claim 9, wherein the second mechanisms are radially overlaid to the first mechanisms.

16. An assembly according to claim 9, wherein the first and second rolls are at least part of a plurality of rolls.

\* \* \* \* \*